United States Patent
Cheng

(10) Patent No.: US 12,216,762 B2
(45) Date of Patent: Feb. 4, 2025

(54) FIRMWARE VERIFICATION SYSTEM AND FIRMWARE VERIFICATION METHOD

(71) Applicant: Nuvoton Technology Corporation, Hsinchu Science Park (TW)

(72) Inventor: Min-Nan Cheng, Jhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 191 days.

(21) Appl. No.: 17/965,165

(22) Filed: Oct. 13, 2022

(65) Prior Publication Data

US 2023/0214491 A1 Jul. 6, 2023

(30) Foreign Application Priority Data

Dec. 30, 2021 (TW) .................................. 110149524

(51) Int. Cl.
*G06F 21/57* (2013.01)
*H04L 9/30* (2006.01)
*H04L 9/32* (2006.01)

(52) U.S. Cl.
CPC .......... *G06F 21/572* (2013.01); *G06F 21/575* (2013.01); *H04L 9/30* (2013.01); *H04L 9/3247* (2013.01); *G06F 2221/033* (2013.01)

(58) Field of Classification Search
CPC ................. G06F 21/572; G06F 21/575; G06F 2221/033; G06F 21/44; G06F 21/64; H04L 9/30; H04L 9/3247; H04L 9/3236
See application file for complete search history.

(56) References Cited

U.S. PATENT DOCUMENTS

| 2014/0380031 | A1* | 12/2014 | Jones | G06F 21/572 |
| | | | | 713/2 |
| 2017/0039053 | A1* | 2/2017 | Siluvainathan | G06F 9/4401 |
| 2017/0109533 | A1* | 4/2017 | Shah | G06F 21/554 |
| 2018/0157840 | A1* | 6/2018 | Crowley | G06F 21/575 |
| 2021/0081537 | A1 | 3/2021 | Strong et al. | |

FOREIGN PATENT DOCUMENTS

| CN | 102339227 A | 2/2012 |
| TW | 202009778 A | 3/2020 |
| TW | 202115571 A | 4/2021 |

OTHER PUBLICATIONS

Office Action dated Oct. 6, 2022 issued in the corresponding Taiwan Application No. 110149524.

* cited by examiner

*Primary Examiner* — Mohammad W Reza
(74) *Attorney, Agent, or Firm* — MUNCY, GEISSLER, OLDS & LOWE, P.C.

(57) ABSTRACT

A firmware verification system is suitable for a secure boot stage. The firmware verification system comprises a non-volatile firmware list storage device. The non-volatile firmware list storage device is configured to store a firmware list; wherein each entry corresponds to a firmware stored in a flash memory in a microcontroller, and each entry includes a plurality of fields. The bootloader reads the entries. According to the contents of the fields in each entry, the bootloader determines the correctness of the public key and the correctness of the digital signature for each firmware in the microcontroller.

10 Claims, 7 Drawing Sheets

FIRMWARE VERIFICATION SYSTEM AND FIRMWARE VERIFICATION METHOD

CROSS REFERENCE TO RELATED APPLICATIONS

This application claims priority of Taiwan Patent Application No. 110149524, filed on Dec. 30, 2021, the entirety of which is incorporated by reference herein.

BACKGROUND OF THE INVENTION

Field of the Invention

The present disclosure is related to a firmware verification system, and in particular, to a firmware verification system and a firmware verification method suitable for a secure boot stage.

Description of the Related Art

As the Internet of Things (IoT) has developed, the industry has been paying more and more attention to the security of networked devices. Microcontroller (or MCU) suppliers, software and firmware developers, terminal equipment manufacturers, and relevant government agencies are looking for schemes and standards to confirm the safety of their equipment. Microcontrollers are the core of networked devices. The security of microcontrollers is related to whether the terminal device can be trusted. Therefore, the security of microcontrollers is of utmost importance.

In order to ensure the security of a microcontroller, it must be confirmed that the firmware running on the microcontroller is correct and has not been tampered with. A secure boot function is usually used on today's microcontrollers for this purpose.

However, this method requires that after all firmware development is complete, all firmware must be integrated into a single firmware image. This firmware image is then signed by one of the developers (e.g., the integrator or foremost) using its private key. Once any of these firmware changes are made, the entire firmware integration and signing process must be rerun.

Therefore, how to verify multiple microcontrollers in a secure boot stage has become one of the problems to be solved in the art.

BRIEF SUMMARY OF THE INVENTION

In accordance with one feature of the present invention, the present disclosure provides a firmware verification system, which is suitable for a secure boot stage. The firmware verification system includes a read-only memory (ROM), a microcontroller, and a non-volatile firmware list storage device. The read-only memory is configured to store a bootloader. The microcontroller includes a flash memory. The flash memory stores firmware. The non-volatile firmware list storage device stores a firmware list. The firmware list includes a plurality of entries; wherein each entry corresponds to the firmware stored in the flash memory, and each entry includes a plurality of fields. The bootloader reads the entries. According to the content of the fields in each entry, the bootloader determines the correctness of the public key and the correctness of the digital signature of the firmware in the microcontroller.

In accordance with one feature of the present invention, the present disclosure provides a firmware verification method. The firmware verification method is suitable for a secure boot stage. The firmware verification method comprises the following steps. A bootloader is stored in a read-only memory (ROM). Storing firmware in flash memory. The flash memory is included in the microcontroller. A firmware list is stored in a non-volatile firmware list storage device. The firmware list includes a plurality of entries. Each entry corresponds to the firmware stored in the flash memory. Each entry includes a plurality of fields. The bootloader reads the entries. According to the content of the fields in each entry, the bootloader determines the correctness of a public key and the correctness of a digital signature of the firmware in the microcontroller.

In accordance with one feature of the present invention, the present disclosure provides a firmware verification system, which is suitable for a secure boot stage. The firmware verification system comprises a non-volatile firmware list storage device. The non-volatile firmware list storage device is configured to store a firmware list. Each entry corresponds to a firmware stored in the flash memory in the microcontroller. Each entry includes a plurality of fields. The bootloader reads the entries. Based on the contents of the fields in each entry, the bootloader determines the correctness of the public key and the correctness of the digital signature for each firmware in the microcontroller.

It can be seen from the above description that the secure boot stage confirms whether the source of the firmware stored in the microcontroller is correct by verifying the digital signature and whether the firmware itself has not been tampered with. Therefore, the correct public key must be stored on the microcontroller for verification of the digital signature. In practical applications, multiple firmware can be stored in the microcontroller, including application code and third-party function libraries. These firmware are released by different software developers, and the public keys of each developer are required to verify each different firmware. The firmware verification system and firmware verification method proposed by the present invention do not need to store multiple public keys in the microcontroller. By storing firmware-related data in the firmware list and cooperating with the operation of the bootloader, the correctness of the public key of each firmware and the correctness of the digital signature of each firmware can be confirmed in each flash memory during the system startup stage, so as to achieve the effect of certifying the security of multiple firmware.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

Figure 1:
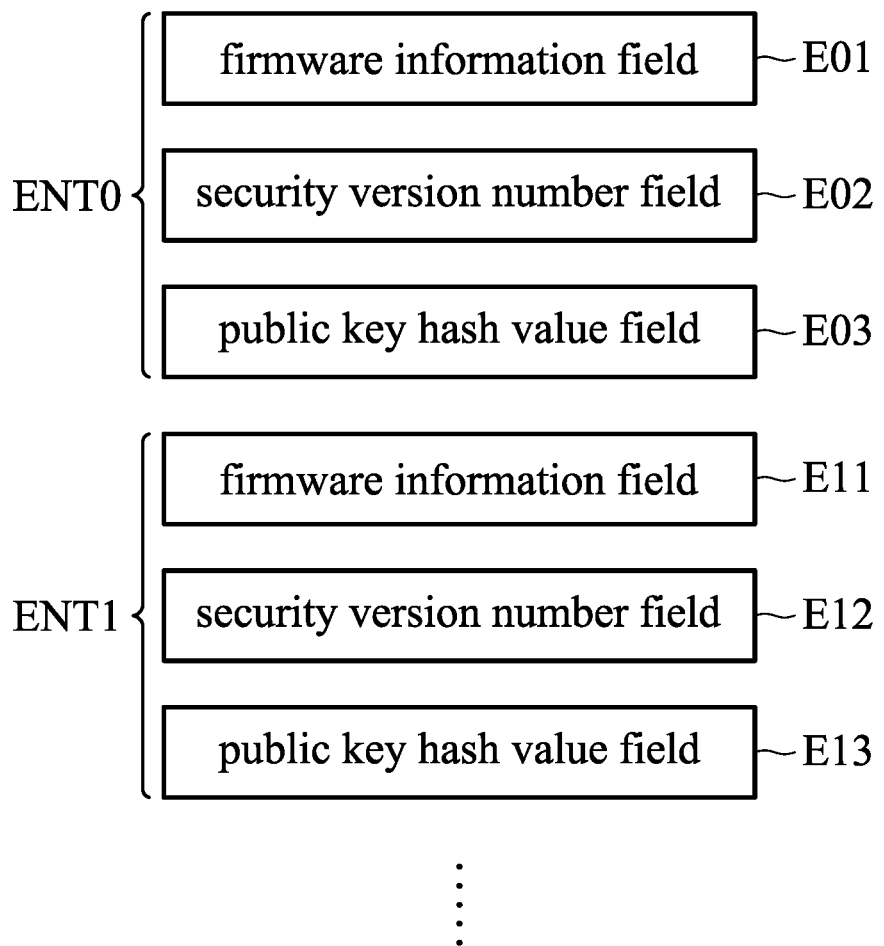
FIG. 1 is a schematic diagram illustrating a firmware list in accordance with one embodiment of the present disclosure.

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. Furthermore, it should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Generally speaking, in order to support secure boot, there is an immutable memory in the microcontroller to store the bootloader. The bootloader is executed when the system is turned on, and uses cryptographic digital signatures to verify the authenticity and integrity of the firmware stored in the flash memory, preventing malware from being executed.

The above secure boot method is based on asymmetric cryptography. In actual operation, a pair of public key and private key needs to be generated, the public key and private key called a key pair. The private key is kept secret by the software developer, and the public key is loaded into the microcontroller. This public key is called the secure public key. If a software developer releases new code (because of mass production or firmware update), a new digital signature needs to be generated by using the private key, the action called signing. When the program code is loaded into the flash memory of the microcontroller, the digital signature must be loaded at the same time. Based on the mathematical principles of asymmetric cryptography, only the corresponding public key can unlock the digital signature and successfully pass the verification. If the firmware stored in the flash memory is released by the same developer, the above method can run smoothly. However, if multiple firmwares released by different developers (such as applications and more than one function library) are stored in the flash memory, the use of this method will be limited. For example, after all firmware development is completed, it must be integrated into a single firmware image, and then one of the developers (integrator or most important) uses its private key to sign this firmware image. Once any of these firmware changes are made, the entire firmware integration and signing process must be rerun.

Therefore, the following describes a firmware verification system and a firmware verification method for verifying multiple microcontrollers in the secure boot stage.

Figure 2A:
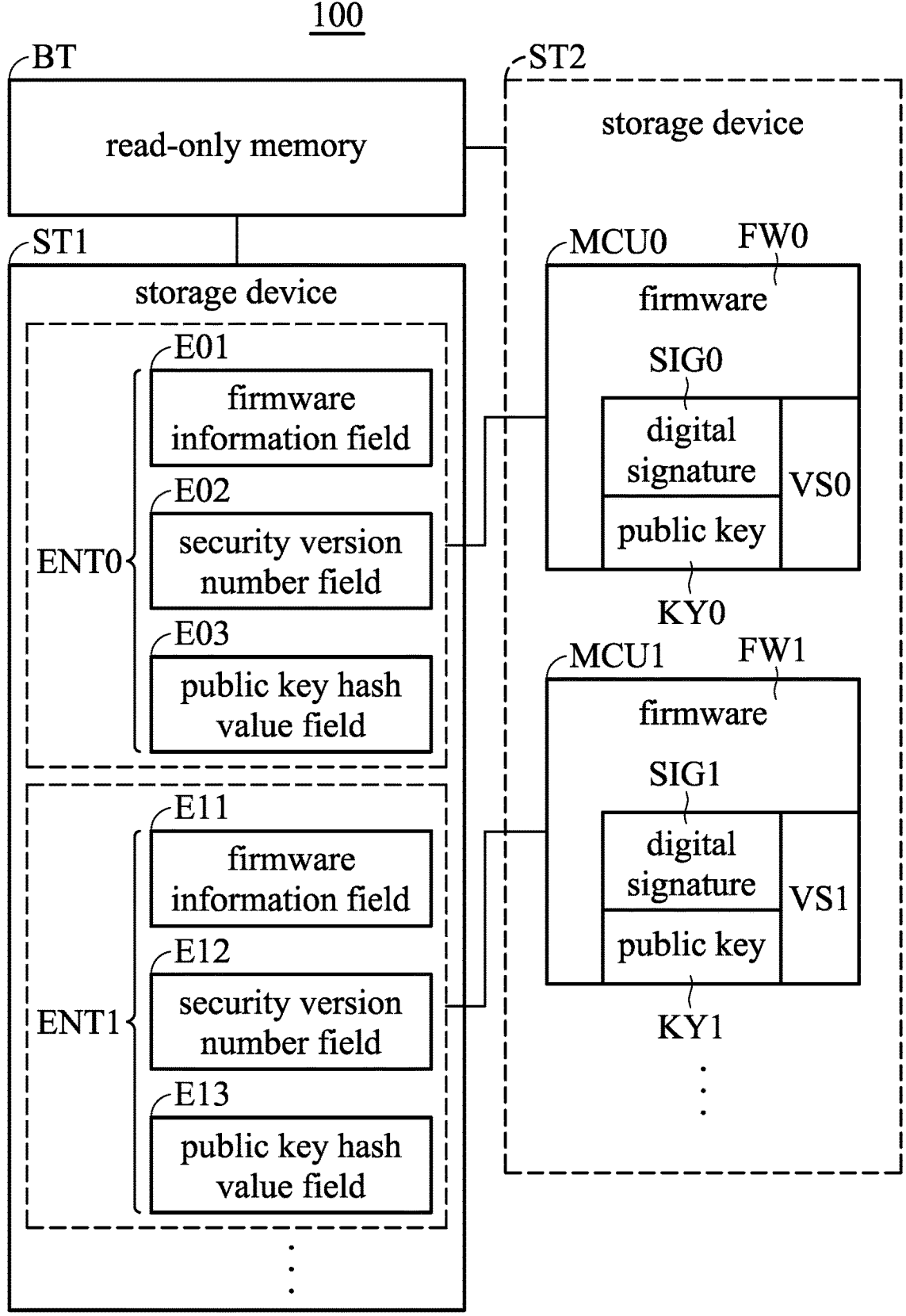
FIG. 2A is a schematic diagram illustrating a firmware verification system 100 in accordance with one embodiment of the present disclosure.
Figure 2B:
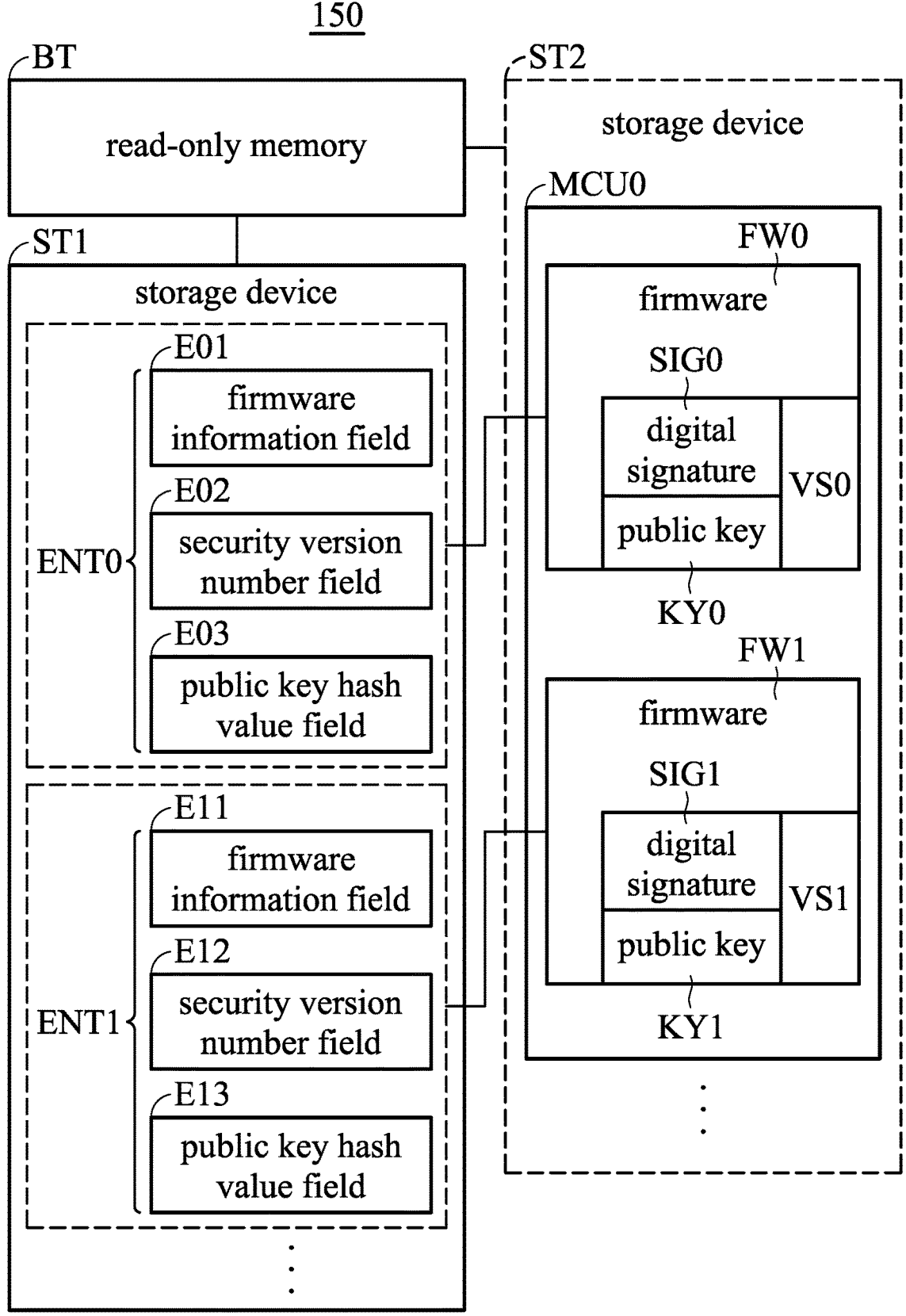
FIG. 2B is a schematic diagram illustrating the firmware verification system 150 in accordance with one embodiment of the present disclosure.

Please refer to FIGS. 1 and 2A-2B. FIG. 1 is a schematic diagram illustrating a firmware list in accordance with one embodiment of the present disclosure. FIG. 2A is a schematic diagram illustrating a firmware verification system 100 in accordance with one embodiment of the present disclosure. FIG. 2B is a schematic diagram illustrating the firmware verification system 150 in accordance with one embodiment of the present disclosure.

As shown in FIG. 1, in one embodiment, in order to enable the bootloader to verify the firmware released by each developer during secure boot, the microcontroller of the firmware verification system 100 stores a set of non-volatile firmware list.

In one embodiment, the microcontroller configured to run the bootloader in the firmware verification system 100 can cutout a space from the existing flash memory in the firmware verification system 100 to store the firmware list, or the firmware verification system 100 can be specially designed. Also, a separate multi-time-programing (MTP) memory in the microcontroller can be configured to store the firmware list.

In one embodiment, the firmware list can be stored in a non-volatile entry storage device ST1. The non-volatile entry storage device ST1 can be a read-only memory, a rewritable memory or a one-time programmable (OTP).

The firmware list contains multiple entries ENT0, ENT1 . . . etc. Entry ENT1 follows entry ENT1. Each entry ENT0, ENT1 contains a plurality of fields. For example, the entry ENT0 includes a firmware information field E01, a security version number field E02, and a public key hash value field E03. The entry ENT1 includes a firmware information field E11, a security version number field E12, and a public key hash value field E13.

In one embodiment, the content of the firmware information field E01 includes the length of the firmware, the storage address of the firmware, and the storage address of the firmware information of the firmware FW0. The content of the firmware information field E02 includes the length of the firmware, the storage address of the firmware, and the storage address of the firmware information of the firmware FW1.

In one embodiment, the security version number fields E02 and E12 are used to store a security version number for preventing roll-back attacks. The term roll-back attack refers to restoring a state that has occurred to the way it did not occur, causing data or program execution errors. The security version number refers to the current version number of the tested or corrected firmware, the larger the number, the newer the version. If the bootloader executes the firmware FW0 and finds that the version number VS0 of the firmware FW0 is smaller than the security version number in the security version number field E02, it means that the firmware FW0 is wrong and the version of the firmware FW0 may have been changed.

In one embodiment, the bootloader determines whether the firmware version VS0 in the firmware information stored in the flash memory is greater than or equal to the security version number (the content of the security version number field E02) in the corresponding entry. When the bootloader determines that the firmware version VS0 in the firmware information stored in the flash memory is smaller than the security version number in the corresponding entry, the firmware FW0 corresponding to the firmware version is not executed.

In one embodiment, the public key hash value field E03 is configured to store the hash value of a public key in firmware information (e.g., information of firmware FW0). The public key hash value field E13 is configured to store the hash value of a public key in firmware information (e.g., information of firmware FW1).

In one embodiment, the firmware verification system 100 shown in FIG. 2A is suitable for a secure boot stage. The firmware verification system 100 includes: a read-only memory (ROM) BT, a plurality of microcontrollers MCU0, MCU1 and a non-volatile firmware list storage device ST1.

In one embodiment, as shown in FIG. 2B, a firmware verification system is suitable for a secure boot stage. The firmware verification system 150 includes: a read-only memory (ROM) BT, a microcontroller MCU0, and a non-volatile firmware list storage device ST1.

The difference between FIG. 2B and FIG. 2A is that in the firmware verification system 150 of FIG. 2B, each firmware FW0, FW1 is located in the same microcontroller MCU0. The flash memory in the microcontroller MCU0 is configured to store the firmware FW0 and FW1.

Thereby, the firmware verification system 150 shown in FIG. 2B only needs one microcontroller MCU0 to run multiple firmwares FW0 and FW1. Other details are the same as those in FIG. 2A, so they are not repeated here.

In one embodiment, the ROM BT is used to store a bootloader.

In one embodiment, the firmware in the multiple microcontrollers MCU0 and MCU1 can be integrated into the same storage device ST2. In one embodiment, the storage device ST2 can be implemented by flash memory.

In one embodiment, one or more firmwares in a single microcontroller MCU0 can be integrated into the same storage device ST2. In one embodiment, the storage device ST2 can be implemented by flash memory.

In one embodiment, the firmware in the plurality of microcontrollers MCU0 and MCU1 can be stored in different storage devices, and the storage devices can be implemented by flash memory.

In one embodiment, one or more firmware in a single microcontroller MCU0 can be stored in different storage devices, and the storage devices can be implemented by flash memory.

In one embodiment, the microcontrollers MCU0 and MCU1 can each be a microcontroller, a microprocessor, a digital signal processor, or an application specific integrated circuit (ASIC) or a logic circuit to implement it.

In one embodiment, the microcontrollers MCU0 and MCU1 each include a flash memory, and each flash memory is configured to store a firmware FW0 and FW1, that is, the flash memory in the microcontroller MCU0 is used to store the firmware FW0, the flash memory in the microcontroller MCU1 is used to store the firmware FW1.

In one embodiment, the microcontroller MCU0 includes a flash memory, and the flash memory is configured to store a firmware FW0 and FW1, that is, the flash memory in the microcontroller MCU0 is configured to store the firmware FW0 and the firmware FW1.

In one embodiment, the non-volatile firmware list storage device ST1 is configured to store a firmware list. The firmware list contains multiple entries (for example, entry ENT0, entry ENT1). The entries ENT0 and ENT1 correspond to the firmware stored in each flash memory, respectively. For example, the entry ENT0 corresponds to the firmware FW0, the entry ENT1 corresponds to the firmware FW1, and each entry ENT0, ENT1 includes a plurality of fields. For example, the entry ENT0 contains a firmware information field E01, a security version number field E02, and a public key hash value field E03, and the entry ENT1 includes a firmware information field E11, a security version number field E12, and a public key hash value field E13.

In one embodiment, in the secure boot stage, the bootloader reads the firmware information field E01 in the entry ENT0 to obtain the length of the firmware, storage address of the firmware, and storage address of the firmware information of the firmware FW0.

In one embodiment, the bootloader is configured to read the entries ENT0 and ENT1. According to the content of the fields in each entry, the bootloader determines the correctness of the public key and the correctness of the digital signature of the respective firmware FW0 and FW1 of each microcontroller MCU0 and MCU1. The flash memory included in the microcontrollers MCU0 and MCU1 is configured to store their respective firmware information. For example, firmware FW0 contains firmware information, and that firmware information includes digital signature SIG0, public key KY0, and firmware version VS0. Firmware FW1 contains firmware information, and that firmware information includes digital signature SIG1, public key KY1, and firmware version VS1.

Figure 3:
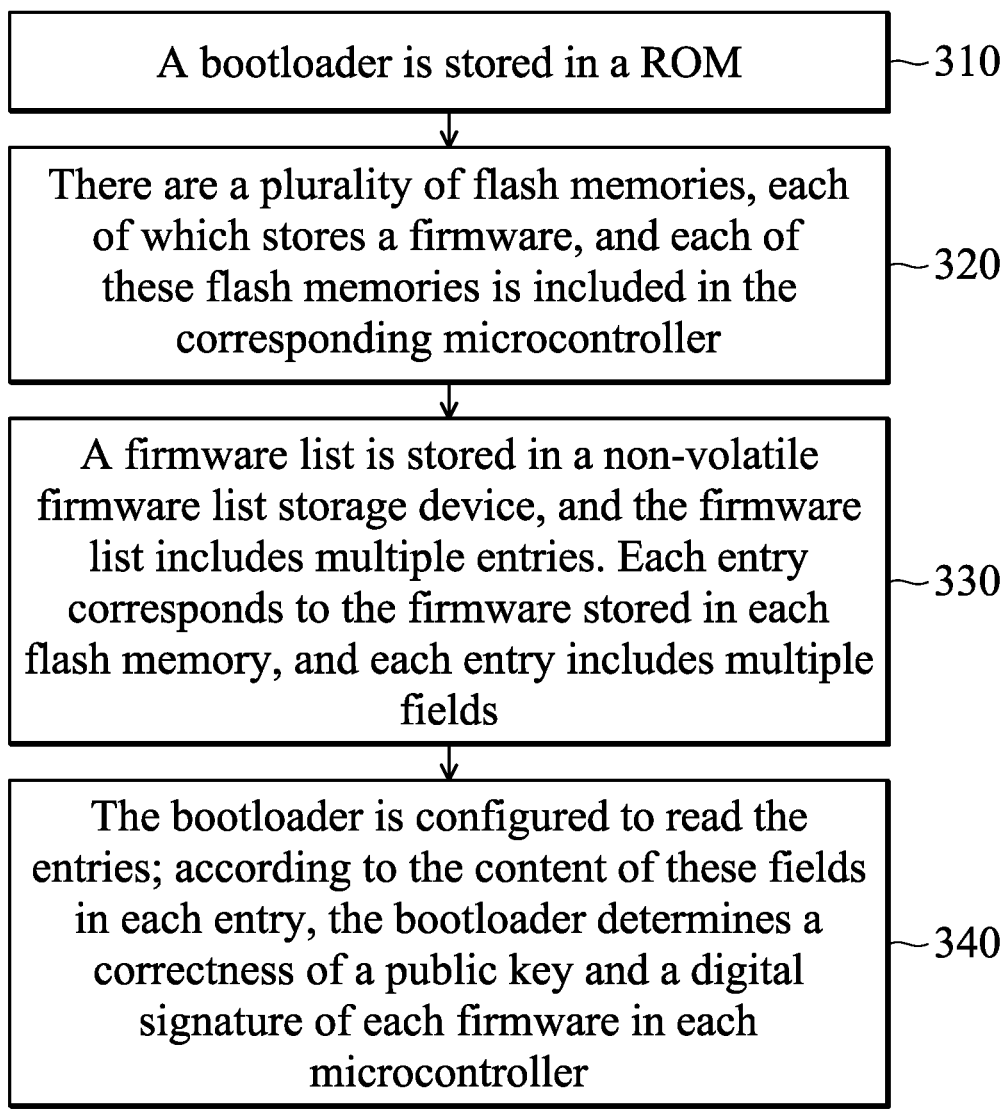
FIG. 3 is a flowchart of a firmware verification method in accordance with one embodiment of the present disclosure.

Please refer to FIG. 3, which is a flowchart of a firmware verification method 300 in accordance with one embodiment of the present disclosure. The firmware verification method 300 can be implemented by the firmware verification system 100 or the firmware verification system 150. Firmware authentication method 300 applies to a secure boot stage. In step 310, a bootloader is stored in a ROM BT. In step 320, there are a plurality of flash memories, each of which stores a firmware (a flash memory in a single microcontroller can also store one or more firmware). Each of these flash memories is included in the corresponding microcontroller. In step 330, a firmware list is stored in a non-volatile firmware list storage device, and the firmware list includes multiple entries. Each entry corresponds to the firmware stored in each flash memory, and each entry includes multiple fields (it may also be that each entry corresponds to the firmware stored in a single flash memory). In step 340, the bootloader is configured to read the entries. According to the content of these fields in each entry, the bootloader determines a correctness of a public key and a digital signature of each firmware in each microcontroller (it is also possible to determine the correctness of a public key and a digital signature of each firmware in a single microcontroller according to the contents of these fields in each entry).

Figure 4A:
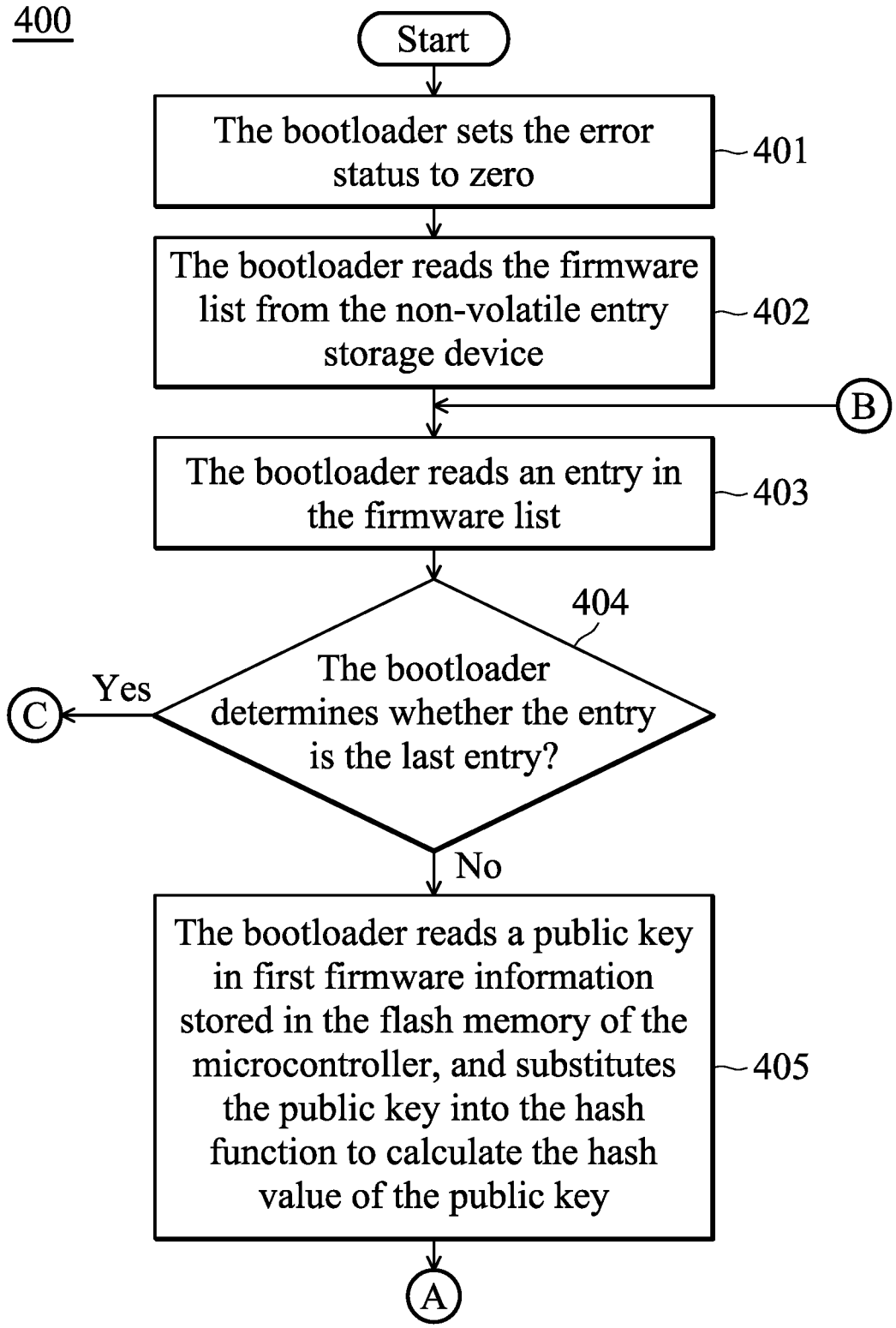
FIGS. 4A-4C are flowcharts of a firmware verification method in accordance with one embodiment of the present disclosure.
Figure 4B:
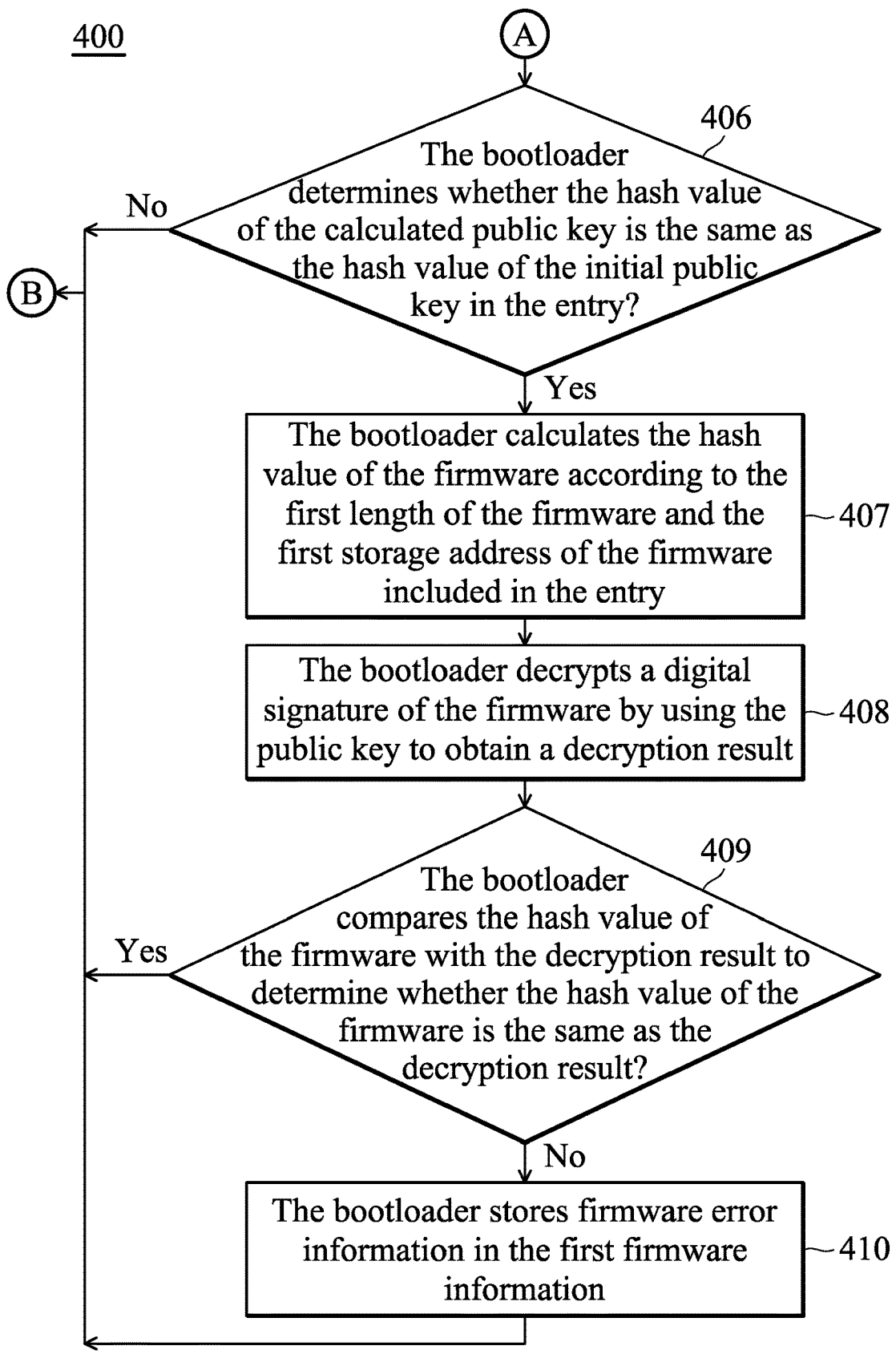
Figure 4C:
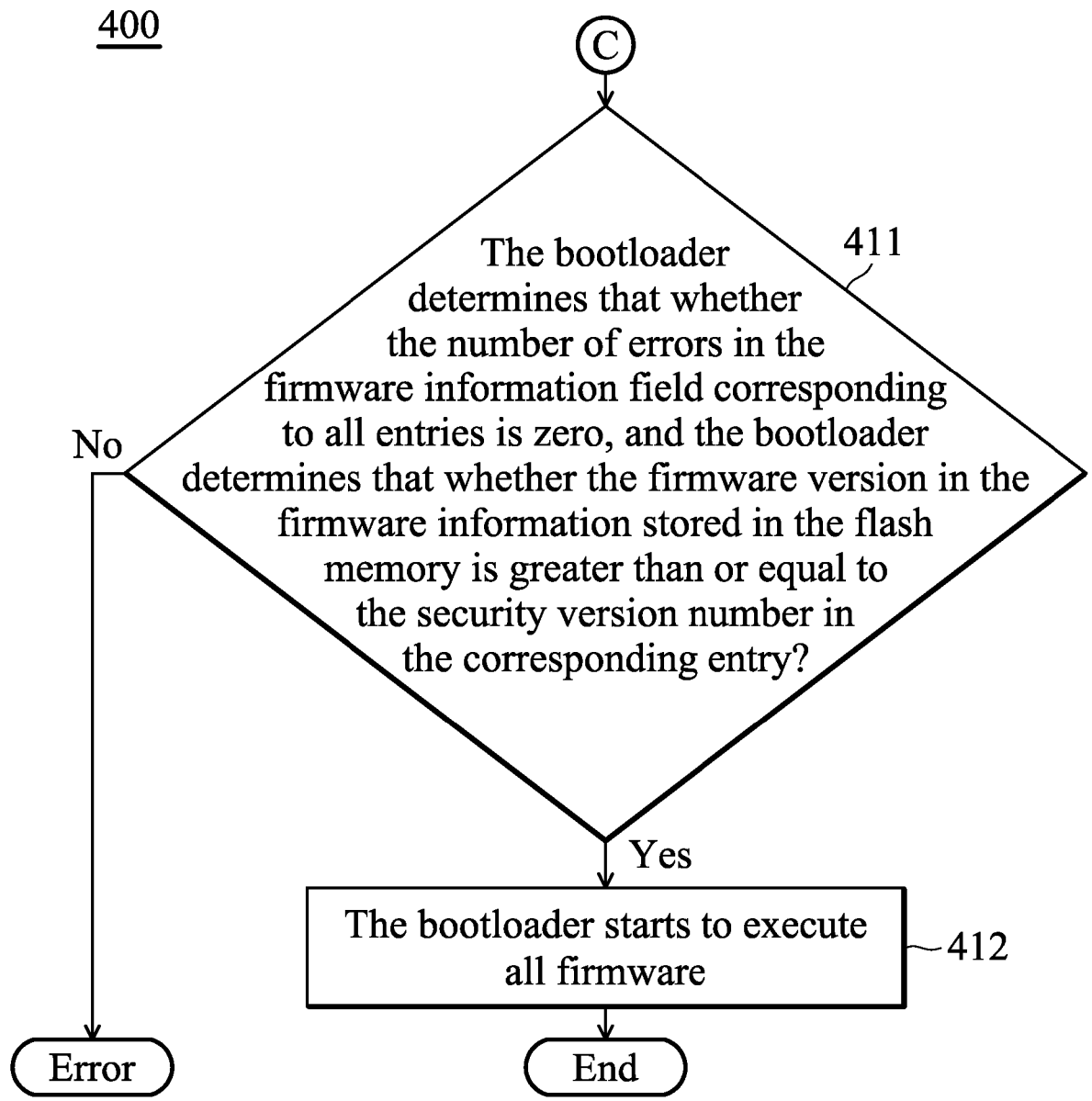

Please refer to FIGS. 4A-4C, which are flowcharts of a firmware verification method 400 in accordance with one embodiment of the present disclosure. FIGS. 4A-4C illustrate the firmware verification method 400 during the secure boot stage in more detail.

In step 401, the bootloader sets the error status to zero.

In this step, the error status can be set to zero (e.g., ErrorStatus=0) by executing the code written in the bootloader in advance.

In step 402, the bootloader reads the firmware list from the non-volatile entry storage device ST1.

In step 403, the bootloader reads an entry in the firmware list.

In one embodiment, the bootloader reads all entries in the firmware list in advance, and counts the number of entries.

In one embodiment, the bootloader reads all entries in the firmware list, and finds an end code in the last entry to determine the number of entries.

In step 404, the bootloader determines whether the entry is the last entry.

In one embodiment, the bootloader can determine whether the entry is the last entry based on the number of processed entries or the end code.

In one embodiment, when the bootloader determines that the entry is the last entry, the process proceeds to step 411; when the bootloader determines that the entry is not the last entry, the process proceeds to step 405.

For the convenience of description, the following takes the entry ENT0 as the non-last entry as an example, and the entry ENT1 as the last entry as an example.

In step 405, the bootloader reads a public key KY0 in first firmware information stored in the flash memory of the microcontroller MCU0, and substitutes the public key KY0 into the hash function to calculate the hash value of the public key KY0.

In one example, the first firmware information is firmware information stored in the flash memory of the microcontroller MCU0, and the firmware information is used to describe the firmware FW0.

In step 406, the bootloader compares the hash value of the calculated public key KY0 with the hash value of the initial public key in the entry ENT0, the bootloader determines whether the hash value of the calculated public key KY0 is the same as the hash value of the initial public key in the entry ENT0.

The hash value of the initial public key in the entry ENT0 is stored in the public key hash value field E03.

When the bootloader determines that the calculated hash value of the public key KY0 is the same as the hash value of the initial public key in the entry ENT0, it determines that the public key KY0 is correct, and then step 407 is executed.

When the bootloader determines that the calculated hash value of the public key KY0 is not the same as the hash value of the initial public key in the entry ENT0, it determines that the public key KY0 is wrong, and stores public key error information in the first firmware information, go back to step 403 to read the next entry (for example, the next entry is the entry ENT1, the bootloader starts to read the firmware information field E11 in the entry ENT1 to obtain the length of the firmware, storage address of the firmware, and storage address of the firmware information of the firmware FW1).

In step 407, the bootloader calculates the hash value of the firmware FW0 according to the first length of the firmware and the first storage address of the firmware included in the entry ENT0.

In step 408, the bootloader decrypts a digital signature SIG0 of the firmware FW0 by using the public key KY0 to obtain a decryption result.

In one embodiment, the digital signature SIG0 is generated by encrypting the hash value of the firmware FW0 with a private key. The private key in this example corresponds to the public key KY0, and the mathematical principle is the application of asymmetric cryptography.

In step 409, the bootloader compares the hash value of the firmware FW0 with the decryption result to determine whether the hash value of the firmware FW0 is the same as the decryption result.

When the hash value of the firmware FW0 is the same as the decryption result, it is determined that the first digital signature is correct, and step 409 is executed.

When the hash value of the firmware FW0 is not the same as the decryption result, it is determined that the content of the firmware FW0 is wrong, and step 410 is executed.

In step 410, the bootloader stores firmware error information in the first firmware information, for example, sets the error status to 1 (e.g., ErrorStatus=1), and directly executes step 403 to read the next entry ENT1.

In step 411, the bootloader determines that whether the number of errors in the firmware information field corresponding to all entries is zero, and the bootloader determines that whether the firmware version in the firmware information stored in the flash memory is greater than or equal to the security version number in the corresponding entry.

When the bootloader determines that the number of errors in the firmware information field corresponding to all entries is zero, and the bootloader determines that the firmware version in the firmware information stored in the flash memory is greater than or equal to the security version number in the corresponding entry, the step 412 is performed.

When the bootloader determines that the number of errors in the firmware information field corresponding to all entries is not zero, or when the bootloader determines that the firmware version in the firmware information stored in the flash memory is less than the security version number in the corresponding entry, it means there is an error in the firmware, and no firmware is executed.

The previous step of step 411 is step 404, and step 404 is to determine whether the last entry has been executed, if so, the step 411 is performed, so in step 411. Therefore, in step 411, the number of errors and the firmware version in the firmware information field corresponding to all the entries can be known.

In step 412, the bootloader starts to execute all firmware ENT0 and ENT1. After the execution is completed, the process ends.

In one embodiment, the firmware verification system 100 can be applied to an unmanned aerial vehicle, because the unmanned aerial vehicle requires a microcontroller to run the flight application, and also requires many microcontrollers (or sensors) to detect altitude and angle and other information. In this example, the firmware ENT0 is, for example, the main flight control application in the microcontroller on the drone. The firmware ENT1 is the firmware of another microcontroller used to judge the angle on the drone.

It can be seen from the above that the secure boot stage confirms whether the source of the firmware stored in the microcontroller is correct by verifying the digital signature and whether the firmware itself has not been tampered with. Therefore, the correct public key must be stored on the microcontroller for verification of the digital signature. In practical applications, multiple firmware can be stored in the microcontroller, including application code and third-party function libraries. These firmware are released by different software developers, and the public keys of each developer are required to verify each different firmware. The firmware verification system and firmware verification method proposed by the present invention do not need to store multiple public keys in the microcontroller. By storing firmware-related data in the firmware list and cooperating with the operation of the bootloader, the correctness of the public key of each firmware and the correctness of digital signature of each firmware can be confirmed in each flash memory during the system startup stage, so as to achieve the effect of certifying the security of multiple firmware.

The methods of the present invention, or specific versions or portions thereof, may exist in the form of code. The code may be contained in physical media, such as floppy disks, optical discs, hard disks, or any other machine-readable (such as computer-readable) storage media, or not limited to external forms of computer program products. When the code is loaded and executed by a machine, such as a computer, the machine becomes a device for participating in the present invention. Code can also be transmitted through some transmission medium, such as wire or cable, optical fiber, or any transmission type. When the code is received, loaded and executed by a machine, such as a computer, the machine becomes a device for participating in the present invention. When implemented on a general-purpose processing unit, the code in conjunction with the processing unit provides a unique device that operates similarly to application-specific logic circuits.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A firmware verification system, suitable for a secure boot stage;
    wherein the firmware verification system comprises:
        a read-only memory (ROM), configured to store a bootloader;
        a microcontroller, including a flash memory for storing a plurality of firmware; and
        a non-volatile firmware list storage device, configured to store a firmware list; wherein the firmware list includes a plurality of entries; wherein each entry respectively corresponds to one of the firmware stored in the flash memory, and each entry includes a firmware information field, a security version number field, and a public key hash value field;
        wherein the bootloader is used to read one of the entries, and according to contents of the firmware information field, the security version number field, and the public key hash value field in the one of the entries, to determine correctness of a public key and correctness of a digital signature of the firmware that is corresponding to the one of the entries in the microcontroller.

2. The firmware verification system of claim 1,
    wherein the content of the firmware information field includes a length of the firmware, a storage address of the firmware, and a storage address of the firmware information;
    wherein the security version number field is configured to store a security version number for preventing roll-back attacks;
    wherein the public key hash value field is configured for storing a hash value of a public key in a firmware information.

3. The firmware verification system of claim 1, wherein the flash memory included in the microcontroller is configured to store firmware information of each of the firmware, and the firmware information includes a digital signature, the public key, and a firmware version.

4. The firmware verification system of claim 3, wherein the bootloader determines whether the firmware version in each of the firmware information stored in the flash memory is greater than or equal to a security version number in the corresponding entry;
    when the bootloader determines that the firmware version in each of the firmware information stored in the flash memory is smaller than the security version number in the corresponding entry, the firmware corresponding to the firmware version is not executed.

5. The firmware verification system of claim 1, wherein the entries include a first entry and a second entry, the second entry is located after the first entry, the first entry includes a first initial public key hash value field, the first initial public key hash value field stores a first initial public key hash value, the second entry includes a second initial public key hash value field, and the second initial public key hash value field stores a second initial public key hash value;
    wherein in the secure boot stage, the bootloader reads a first firmware information field in the first entry to obtain a first length of the firmware, a first storage address of the firmware, and a first storage address of the firmware information.

6. The firmware verification system of claim 5, wherein the bootloader reads a first public key in a first firmware information, substitutes the first public key into a hash function to calculate a hash value of the first public key, and then compares the calculated hash value of the first public key with the first initial public key hash value in the first entry;
    when the calculated hash value of the first public key is the same as the first initial public key hash value in the first entry, it is determined that the first public key is correct;
    when the calculated hash value of the first public key is different from the first initial public key hash value in the first entry, it is determined that the first public key is wrong, and the bootloader stores a public key error in the first firmware information, and directly reads the second entry.

7. The firmware verification system of claim 6, wherein when the bootloader determines that the calculated hash value of the first public key is the same as the first initial public key hash value in the first entry, the bootloader calculates a hash value of a first firmware according to the first length of the firmware and the first storage address of the firmware included in the first entry, then uses the first public key to decrypt a first digital signature of the first firmware to obtain a decryption result, and compares a hash value of the first firmware with the decryption result;
    when the hash value of the first firmware is the same as the decryption result, it is determined that the first digital signature is correct;
    when the hash value of the first firmware is different from the decryption result, it is determined that the content of the first firmware is wrong, and the bootloader stores firmware error information in the first firmware information and directly reads the second entry.

8. A firmware verification method, suitable for a secure boot stage, the firmware verification method comprising:
    storing a bootloader in a read-only memory (ROM);
    storing a plurality of firmware in a flash memory; wherein the flash memory is included in a microcontroller;
    storing a firmware list in a non-volatile firmware list storage device; wherein the firmware list includes a plurality of entries; wherein each entry respectively corresponds to one of the firmware stored in the flash memory, and each entry includes a firmware information field, a security version number field, and a public key hash value field; and the bootloader reads one of the entries, and according to contents of the firmware information field, the security version number field, and the public key hash value field in the one of the entries, determines a correctness of a public key and a correctness of a digital signature of the firmware that is corresponding to the one of the entries in the microcontroller.

9. The firmware verification method of claim 8, wherein the bootloader determines that the number of errors in the firmware information field corresponding to all entries is zero, and when the bootloader determines that a firmware version in the firmware information stored in the flash memory is greater than or equal to a security version number in the corresponding entry, the firmware corresponding to the firmware version is allowed to be executed.

10. A firmware verification system, suitable for a secure boot stage; wherein the firmware verification system comprises:

a non-volatile firmware list storage device, configured to store a firmware list; wherein each entry respectively corresponds to one of a plurality of firmware stored in a flash memory in a microcontroller, and each entry includes a firmware information field, a security version number field, and a public key hash value field;

wherein a bootloader reads one of the entries, and according to contents of the firmware information field, the security version number field, and the public key hash value field in the one of the entries, determines a correctness of a public key and a correctness of a digital signature for each firmware that is corresponding to the one of the entries in the microcontroller.

* * * * *